United States Patent
Kangas et al.

(10) Patent No.: US 9,701,514 B2
(45) Date of Patent: Jul. 11, 2017

(54) METHOD AND ARRANGEMENT FOR MONITORING THE OPERATING CONDITION OF A READING DEVICE IN A TRANSPORT SYSTEM

(71) Applicants: Petteri Kangas, Hyvinkaa (FI); Ville Haaksluoto, Launonen (FI)

(72) Inventors: Petteri Kangas, Hyvinkaa (FI); Ville Haaksluoto, Launonen (FI)

(73) Assignee: KONE Corporation, Helsinki (FI)

( * ) Notice: Subject to any disclaimer, the term of this patent is extended or adjusted under 35 U.S.C. 154(b) by 454 days.

(21) Appl. No.: 14/306,826

(22) Filed: Jun. 17, 2014

(65) Prior Publication Data

US 2014/0299422 A1    Oct. 9, 2014

Related U.S. Application Data

(63) Continuation of application No. PCT/FI2013/050056, filed on Jan. 18, 2013.

(30) Foreign Application Priority Data

Jan. 23, 2012    (FI) .................................... 20125072

(51) Int. Cl.
*B66B 1/34* (2006.01)
*B66B 3/02* (2006.01)
(Continued)

(52) U.S. Cl.
CPC .............. *B66B 3/02* (2013.01); *B66B 5/0018* (2013.01); *G06K 7/0095* (2013.01)

(58) Field of Classification Search
CPC ........ B66B 3/02; B66B 5/0018; G06K 7/0095
(Continued)

(56) References Cited

U.S. PATENT DOCUMENTS 3,963,098 A * 6/1976 Lewis .................. B66B 1/3492
187/394
4,898,263 A * 2/1990 Manske ................ B66B 5/0087
187/247
(Continued)

FOREIGN PATENT DOCUMENTS

CN    1446175 A    10/2003
CN    1642840 A    7/2005
(Continued)

OTHER PUBLICATIONS

International Search Report for PCT/FI2013/050056 dated May 6, 2013.
(Continued)

*Primary Examiner* — Anthony Salata
(74) *Attorney, Agent, or Firm* — Harness, Dickey & Pierce, P.L.C.

(57) ABSTRACT

Example embodiments relate to a method and arrangement for monitoring the operating condition of a transport system. In one or more example embodiments, the method includes measuring a value associated with operation of a reader device, the reader device configured to transmit a reading signal to read an identifier, if the identifier is situated within range of the reading signal, and detecting a presence of a functional nonconformance in the operation of the reader device based on the value associated with operation of the reader device.

20 Claims, 3 Drawing Sheets

(51) Int. Cl.
*B66B 5/00* (2006.01)
*G06K 7/00* (2006.01)

(58) Field of Classification Search
USPC ............... 187/247, 248, 277, 391, 393, 394
See application file for complete search history.

(56) References Cited

U.S. PATENT DOCUMENTS

| | | | |
|---|---|---|---|
| 5,274,203 A * | 12/1993 | Skalski | B66B 1/3492 187/287 |
| 5,594,219 A * | 1/1997 | Kamani | B66B 1/46 187/283 |
| 5,747,755 A * | 5/1998 | Coste | B66B 1/3492 187/393 |
| 6,467,585 B1 | 10/2002 | Gozzo et al. | |
| 6,604,611 B2 * | 8/2003 | Liu | B66B 5/0087 187/247 |
| 6,732,839 B2 | 5/2004 | Schuster | |
| 7,264,090 B2 | 9/2007 | Vecchiotti et al. | |
| 7,669,698 B2 * | 3/2010 | Jahkonen | B66B 1/3492 187/247 |
| 7,950,499 B2 * | 5/2011 | Okamoto | B66B 1/3492 187/293 |
| 8,069,958 B2 * | 12/2011 | Lence-Barreiro | B66B 1/34 187/247 |
| 8,123,003 B2 | 2/2012 | Meri et al. | |
| 8,276,716 B2 | 10/2012 | Meri et al. | |
| 8,408,364 B2 * | 4/2013 | Kangas | B66B 1/3492 187/247 |
| 2003/0111300 A1 | 6/2003 | Schuster | |
| 2005/0077357 A1 | 4/2005 | Roux | |
| 2005/0284706 A1 | 12/2005 | Vecchiotti et al. | |
| 2011/0114425 A1 | 5/2011 | Meri et al. | |
| 2012/0031710 A1 | 2/2012 | Meri et al. | |
| 2015/0329321 A1 * | 11/2015 | Hovi | B66B 1/24 187/247 |
| 2015/0336768 A1 * | 11/2015 | Otsuka | B66B 1/36 187/394 |
| 2016/0039635 A1 * | 2/2016 | Kangas | B66B 1/48 187/277 |

FOREIGN PATENT DOCUMENTS

| | | |
|---|---|---|
| CN | 1840461 A | 10/2006 |
| CN | 102112384 A | 6/2011 |
| EP | 1676805 A1 | 7/2006 |
| JP | 2006273541 A | 10/2006 |
| KR | 100379868 B1 | 4/2003 |
| WO | WO-99/48225 A1 | 9/1999 |
| WO | WO-2010018298 A1 | 2/2010 |

OTHER PUBLICATIONS

Written Opinion for PCT/FI2013/050056 dated Ag 24, 2013.
Finnish Search Report for FI20125072 dated Jun. 8, 2012.
Chinese Office Action dated Nov. 24, 2015 issued in corresponding Chinese Application No. 2013800054626.

* cited by examiner

METHOD AND ARRANGEMENT FOR MONITORING THE OPERATING CONDITION OF A READING DEVICE IN A TRANSPORT SYSTEM

This application is a continuation of PCT International Application No. PCT/FI2013/050056 which has an International filing date of Jan. 18, 2013, and which claims priority to Finnish patent application number 20125072 filed Jan. 23, 2012, the entire contents of both which are incorporated herein by reference.

FIELD OF THE INVENTION

The invention relates to solutions for monitoring the operating condition of a reader device reading an identifier provided with a readable marking.

BACKGROUND OF THE INVENTION

Various solutions exist wherein a reader device is used to read different identifiers that are separate from the reader device. In some solutions the reader device is configured to read an identifier that is separate from the reader device and is provided with a readable marking when the identifier is situated within range of the reading signal of the reader device. In some solutions RFID identifiers are read with a reader device. In this case the reader device usually comprises an antenna, by the aid of which the reader device forms a wirelessly propagating electromagnetic reading signal. The identifier to be read in this case also comprises an antenna, and communication between the reader device and the identifier occurs via the aforementioned electromagnetic reading signal. Communication occurring via an electromagnetic field can be based on either the near-field or far-field principle.

In some solutions the identifier also receives the operating electricity it needs from the reading signal, when the identifier is situated within range of the reading signal.

The solutions described above can be used e.g. for identifying an elevator passenger. If the elevator passenger carries along with him/her the aforementioned type of identifier, the elevator passenger who has arrived/is arriving in the building can be identified by reading the marking in the identifier. Identification can occur automatically when an elevator passenger arrives within range of the reading signal of a reader device disposed in the building; in some cases the elevator passenger must also separately hold out the identifier so that it is sufficiently close to the reader device. On the basis of the identification, the control system of the elevator can form an elevator call, which includes default data about the destination floor that is the destination of the identified elevator passenger. If reading of the identifier/identification of the elevator passenger occurs already before the elevator passenger has gone into the elevator car, the elevator call can be allocated for serving to the elevator car best suited for the purpose using in the allocation data about both the departure floor and the destination floor of the elevator passenger. This type of system is advantageous from the viewpoint of an elevator passenger, because it reduces the need for conventional elevator calls given by hand. Also the transport capacity of the elevator system improves.

Failure of a reader device in the aforementioned solutions would result in elevator passengers failing to be identified, in which case elevator calls would have to be given manually with separate call-giving devices. Also the allocation of elevator calls would become more difficult if information about the identification data of elevator passengers was not available.

The aforementioned combination of reader device/identifiers can also be used e.g. for determining the location of an elevator car. One such solution is described in international patent application WO 2010/018298 A1, in which described solution a reader device is fitted in connection with an elevator car and identifiers are disposed in the elevator hoistway beside the path of movement of the elevator car. The position of the stopping floors of an elevator car moving in the elevator hoistway is determined by reading the identifiers fitted beside the path of movement of the elevator car with the reader device fitted in connection with an elevator car. The elevator car is situated at the point of a stopping floor when the identifier is situated within range of the reading signal of the reader device moving along with the elevator car. In the aforementioned solution, the identifiers disposed in the elevator hoistway can also be used to determine the extreme limits of the permitted movement of the elevator car in the elevator hoistway. When the reader device fails, determination of the location of the elevator car no longer succeeds, in which case the elevator car might drive past a stopping floor or move outside the range of permitted movement of the elevator car.

One problem relating to the aforementioned solutions is that detecting failure of a reader device is difficult and repairing a defect is slow, because it can occur only on the basis of feedback received from a user of the elevator or as a consequence of a failure of the control system of the elevator. Failure of the control system of an elevator additionally results in an interruption in the operation of the elevator.

Therefore a need to develop monitoring of the condition of a reader device exists.

AIM OF THE INVENTION

The aim of one or more example embodiments is to solve the aforementioned problems as well as the problems disclosed in the description of the invention below. To achieve this aim the invention discloses a method for monitoring the operating condition of a transport system, a monitoring arrangement for monitoring the condition of a reader device, and also a transport system including same. The preferred embodiments of the invention are described in the dependent claims. Some inventive embodiments and also some inventive combinations of the various embodiments are also presented in the descriptive section and in the drawings of the present application.

SUMMARY OF THE INVENTION

In the method according to the invention for monitoring the operating condition of a transport system a reader device is fitted to the transport system, which reader device is configured to read an identifier that is separate from the reader device and is provided with a readable marking, when the identifier is situated within range of the wirelessly propagated reading signal of the reader device, measuring means are fitted in connection with the reader device for measuring the operation of the reader device, the operation of the reader device is measured in connection with a reading procedure being performed, and also a functional nonconformance of the reader device is determined on the basis of the measurement of the operation of the reader device. In a preferred embodiment of the invention, when a functional nonconformance is detected, a monitoring signal is formed for notifying a functional nonconformance of the reader device. In a preferred embodiment of the invention the aforementioned identifier provided with a readable marking is an RFID identifier and the aforementioned reader device is a reader device of an RFID identifier.

The invention enables regular measurement of the operation of a reader device with means measuring the operation of the reader device. By means of the invention, monitoring of the condition of a reader device can also be automated, in which case failure of the reader device can be detected quickly and information about the failure can be sent via a monitoring signal e.g. to a service center for elevators.

In one preferred embodiment of the invention a reading signal is formed with the reader device, with which reading signal the aforementioned identifier separate from the reader device is read, the reading signal is measured, and if the measuring data of the reading signal deviates from the acceptable, a monitoring signal is formed for notifying a functional nonconformance of the reader device.

In one preferred embodiment of the invention a test identifier provided with a readable marking is fitted in connection with the reader device, and the marking of the test identifier is read with the reader device.

In one preferred embodiment of the invention the marking of the test identifier is uncovered for the reading procedure, the uncovered marking of the test identifier is read and the marking of the test identifier is covered after the reading procedure has ended. In a preferred embodiment of the invention the marking of the test identifier is covered/uncovered with the control of the reader device. In this case the test identifier can be covered during a run with the elevator, in which case the test identifier does not during normal operation of the elevator interfere with the reading of the identifiers fitted beside the path of movement of the elevator car. The test identifier can be uncovered during a standstill of the elevator, for monitoring the operating condition of the reader device; the test identifier can consequently be uncovered e.g. at times of day when the elevator traffic is quieter, for instance at night-time or early in the morning. The test identifier can also be uncovered at regular intervals of time for a short period at a time, in which case also the operating condition of the reader device is monitored regularly.

In a preferred embodiment of the invention if the result of the reading procedure for the marking of the test identifier deviates from the acceptable, a monitoring signal is formed for notifying a functional nonconformance of the reader device. In this case if a reading procedure fails, if in connection with the reading procedure the marking of the test identifier is detected as missing, or if the marking read from the test identifier deviates from the reference value, a monitoring signal is formed for notifying a functional nonconformance of the reader device.

In the monitoring arrangement according to the invention for monitoring the operating condition of a reader device, the reader device is configured to read an identifier that is separate from the reader device and is provided with a readable marking, when the identifier is situated within range of the reading signal of the reader device. The monitoring arrangement comprises measuring means fitted in connection with the reader device for measuring the operation of the reader device, and also a monitoring element, which is configured to determine the operating condition of the reader device on the basis of the measuring data for the operation of the reader device, said data being produced by the aforementioned measuring means.

In a preferred embodiment of the invention, when it determines a functional nonconformance of the reader device, the monitoring element is configured to form a monitoring signal for notifying a functional nonconformance of the reader device.

In one preferred embodiment of the invention the measuring means for measuring the operation of the reader device comprise a test identifier provided with a readable marking fitted in connection with the reader device, and the monitoring element is configured to determine the operating condition of the reader device on the basis of the result of the reading procedure for the marking of the test identifier, i.e. on the basis of information acquired in connection with the reading procedure. The test identifier is preferably fixed in connection with the reader device in such a way that the test identifier can be read with the reader device independently of the location/a change in the location of the reader device.

In one preferred embodiment of the invention the reader device comprises a transmitter for forming a reading signal, and the measuring means for measuring the operation of the reader device comprise a measuring device, with which the reading signal of the reader device is measured. The monitoring element comprises an input for the measuring data of the aforementioned measuring device, and the monitoring element is configured to determine the operating condition of the reader device on the basis of the measuring data being received from the measuring device. The aforementioned reading signal is preferably a wirelessly propagating electromagnetic signal, and the transmitter of the reader device preferably comprises an antenna for forming a reading signal. Also the test identifier preferably comprises an antenna for receiving the reading signal formed by the reader device. In a preferred embodiment of the invention the test identifier is configured to receive its operating electricity from the reading signal formed by the reader device.

The aforementioned marking to be read of the test identifier is preferably configured to be covered and/or uncovered by the control of the reader device. In a preferred embodiment of the invention the monitoring element is configured to start a reading procedure, in which the marking of the test identifier is read with the reader device. The monitoring element is configured to compare the result of the reading procedure for the marking of the test identifier to one or more monitoring criteria, and the monitoring element is configured to form a monitoring signal for notifying a functional nonconformance of the reader device, if the result of the reading procedure for the marking of the test identifier does not fulfill the aforementioned one or more monitoring criteria. In this case the monitoring element is preferably configured to form a monitoring signal for notifying a functional nonconformance of the reader device, if as a result of the reading procedure one or more of the following conditions is fulfilled:

- reading of the marking of the test identifier failed
- data to be read about the marking of the test identifier is missing
- the value read from the marking of the test identifier deviates from the reference value.

The transport system according to the invention comprises a reader device, which is configured to read an identifier that is separate from the reader device and is provided with a readable marking, when the identifier is situated within range of the reading signal of the reader device. A monitoring arrangement according to any of those described above for monitoring the operating condition of a reader device is fitted into the transport system according to the invention.

The invention is also suited to monitoring the operating condition of a reader device to be used for identifying an elevator passenger. This type of reader device can be disposed e.g. in a building beside the path of passage of an elevator passenger, in which case the elevator passenger is identified on the basis of an identifier that is carried along with him/her and is provided with a readable marking. In one embodiment of the invention the reader device is configured to read an identifier that is carried along with an elevator passenger and is provided with a readable marking, after the elevator passenger has arrived within range of the reading signal of the reader device. In this case identification of the elevator passenger can occur automatically when the elevator passenger arrives within range of the reading signal of a reader device disposed in the building; in some cases the elevator passenger must also separately hold out the identifier so that it is sufficiently close to the reader device. On the basis of the identification, the control system of the elevator can form an elevator call, which includes default data about the destination floor that is the destination of the identified elevator passenger. If reading of the identifier/identification of the elevator passenger occurs already before the elevator passenger has gone into the elevator car, the elevator call can be allocated for serving to the elevator car best suited for the purpose using in the allocation data about both the departure floor and the destination floor of the elevator passenger.

The invention is also suited for use in monitoring the operating condition of a reader device in connection with the manufacturing process of a reader device.

By means of the solution according to the invention the operating condition of a reader device can be monitored regularly and also at such moments in time when not a single identifier carried along with an elevator passenger or disposed beside the path of movement of the elevator car is situated within range of the reading signal of the reader device. Owing to this, failure of a reader device can be detected quickly and also information about the failure can be sent e.g. to a service center immediately after detecting the failure, which speeds up the servicing work and repair work of the elevator. When enhancing the efficiency of the monitoring of the operating condition of the reader device, the reliability of the reader device also improves, in which case the reader device can also be used as a safety device of the elevator, e.g. in monitoring the extreme limits of permitted movement of the elevator car as well as in monitoring temporary safety spaces to be formed in the elevator hoistway.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
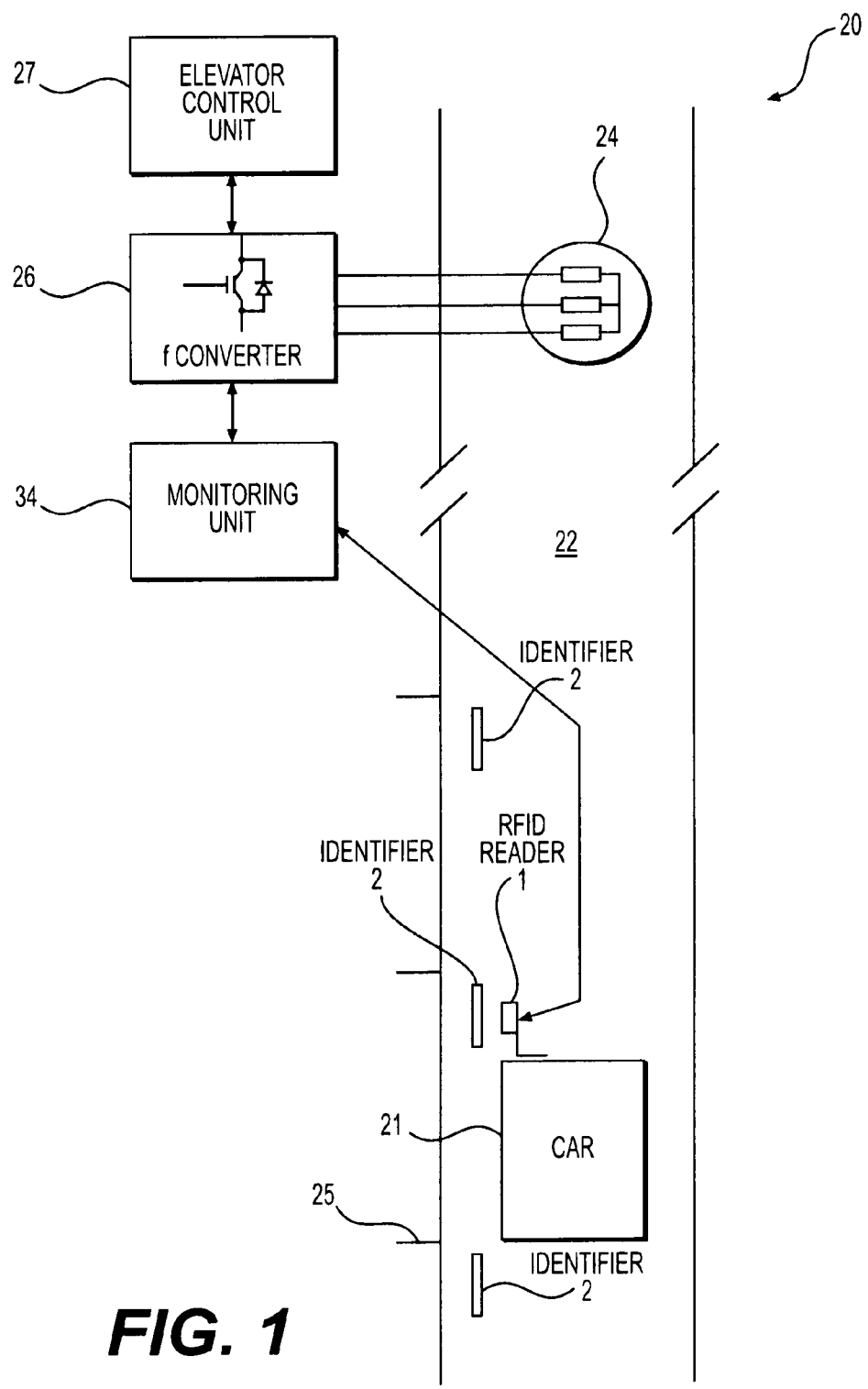
FIG. 1 presents one embodiment of an elevator system.

FIG. 1 presents an embodiment of an elevator system 20, in which the elevator car 21 is suspended in the elevator hoistway 22 with ropes, a belt or corresponding (not presented in FIG. 1) passing via the traction sheave of the hoisting machine 24 of the elevator. The elevator motor of the hoisting machine 24 of the elevator drives the elevator car 21 in the elevator hoistway 22 in an essentially vertical direction between floor levels 25 by rotating the traction sheave of the hoisting machine 24. The elevator control unit 27 calculates the target value for the speed of the elevator car 21, i.e. the speed reference, according to which the elevator car is moved in the elevator hoistway in the manner required by elevator calls. A frequency converter 26 adjusts the speed of the traction sheave, and thereby the speed of the elevator car 21, towards the speed reference by adjusting the current of the elevator motor. An elevator call can include information about the departure floor of an elevator passenger, the floor that is the destination of an elevator passenger, i.e. the destination floor, or a combination of both.

Differing from FIG. 1, the hoisting machine of the elevator can also be disposed in a separate machine room or e.g. in the bottom end zone of the elevator hoistway. The elevator system can also comprise different ropes/a different belt for suspending and for driving the elevator car, i.e. by means of the suspension ropes/suspension belt the elevator car is suspended in the elevator hoistway and via traction ropes separate to these/a traction belt separate to these a pulling force is exerted on the elevator car with the hoisting machine of the elevator, with which force the elevator car is driven.

Figure 2:
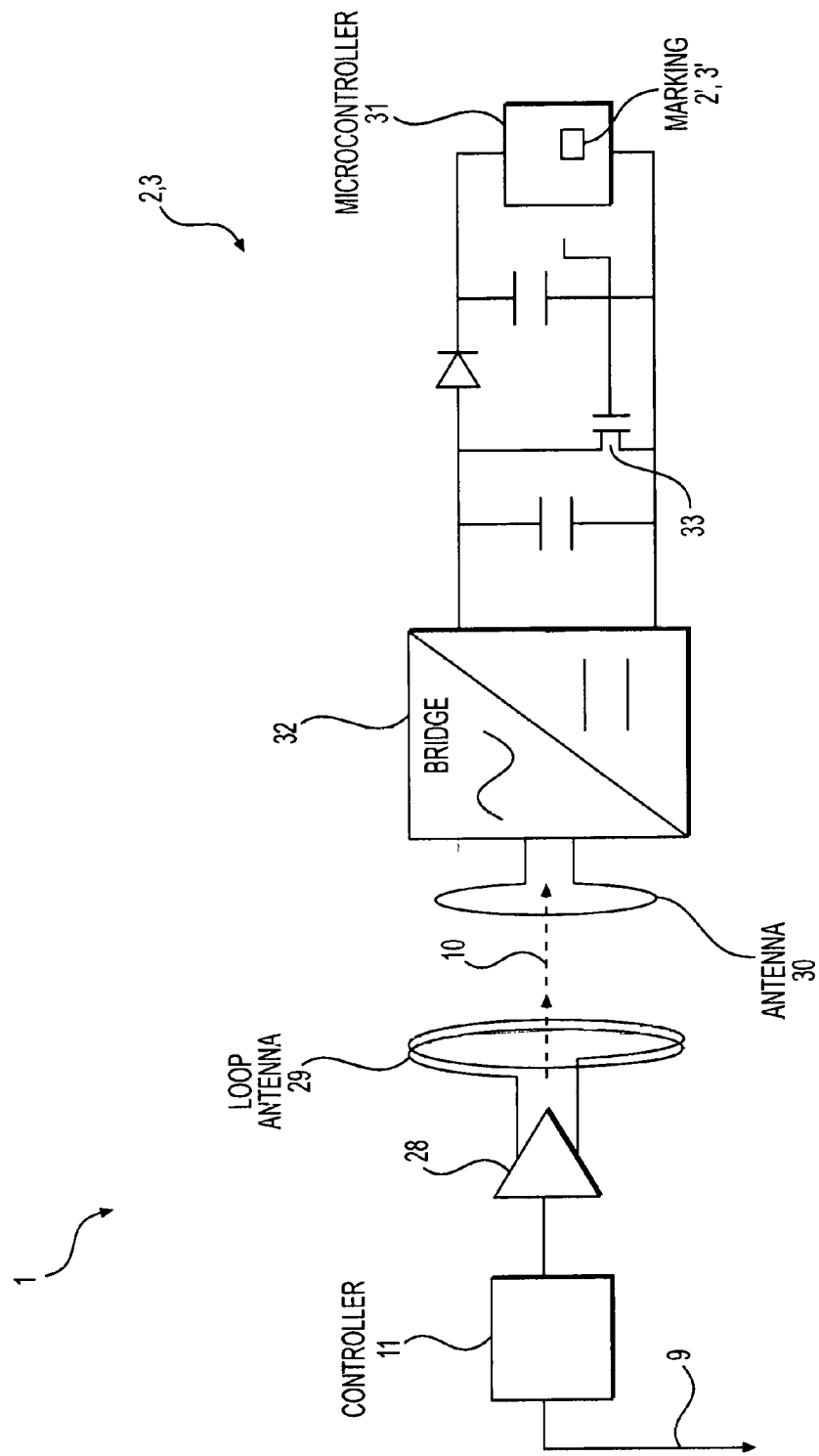
FIG. 2 presents an embodiment, wherein an identifier is disposed within range of the reading signal of a reader device.

In the embodiment of FIG. 1 an arrangement for determining the position of the elevator car 21 in the elevator hoistway 22 is fitted to the elevator system. The arrangement comprises an RFID reader device 1, which is fixed to the roof structure of the elevator car with fixing means. The reader device 1 comprises a loop antenna, which is aligned such that the direction of the electromagnetic radio-frequency reading signal formed by the antenna is essentially at right angles with respect to the direction of movement of the elevator car. RFID identifiers 2 are disposed at selected points in the elevator hoistway 22 beside the path of movement of the elevator car 21. The RFID identifiers 2 are e.g. fixed in connection with the entrances of the elevator hoistway 22 on the side of the elevator hoistway 22. In the situation of FIG. 2, the RFID reader device 1 and the RFID identifier 2 corresponding to a floor level 25 are situated face-to-face, as the floor of the elevator car 21 is situated at the same height as the floor level 25. The orthogonal distance from each other of the reader device 1 and the RFID identifier 2 is in this case at most approx. 30 mm. The RFID identifier 2 of a floor level is in this case disposed within range of the electromagnetic reading signal formed by the reader device 1, and the individualized floor marking recorded in the RFID identifier 2 can be read with the RFID reader device 1. The location of the elevator car 21 at the floor level and also the floor at which the elevator car 21 is situated can consequently be deduced on the basis of the floor marking read.

Separate RFID identifiers (not presented in FIG. 1) are also disposed in the proximity of the bottom end and top end of the elevator hoistway 22, which RFID identifiers indicate the extreme limits of permitted movement of the elevator car 21 in the elevator hoistway. Information about the arrival of the elevator car 21 at an extreme limit of permitted movement is transmitted to an electronic monitoring unit 34, which reacts to the information by activating a machinery brake to brake the movement of the traction sheave of the hoisting machine 24. If the safety of the elevator system so requires, the monitoring unit 34 also activates a guide-rail safety gear of the elevator car, which wedges against the guide rail of the elevator car 21. An end buffer (not presented in FIG. 1) is also fitted to the bottom end of the elevator hoistway 22, said buffer being for damping the impact that would be caused by collision of the elevator car 21 into the end of the elevator hoistway 22.

FIG. 2 presents in more detail the situation of FIG. 1, in which an RFID identifier 2 is situated within range of the electromagnetic reading signal 10 formed by the RFID reader device 1. With the amplifier circuit 28 in the RFID reader device 1 a high-frequency signal is supplied to the loop antenna 29 of the RFID reader device 1, in which case the loop antenna 29 forms a wirelessly-propagating, electromagnetic, radio-frequency reading signal 10. When the antenna 30 of the RFID identifier 2 is situated at an essentially shorter distance from the loop antenna 29 of the RFID reader device 1 than the wavelength of the measuring signal 10, the antenna 30 of the RFID identifier 2 inductively connects to the aforementioned reading signal 10. In one embodiment of the invention the frequency of the electromagnetic reading signal 10 is 13.56 MHz. The distance between the loop antenna 29 of the RFID reader device 1 and the antenna 30 of the RFID identifier 2 is in this case at most approx. 30 mm.

The RFID identifier 2 comprises a microcircuit 31, which receives its operating electricity from the reading signal 10 during the inductive connection. In this case the reading signal 10 produces a response signal in the antenna 30 of the RFID identifier, which response signal is rectified into the operating electricity of the microcircuit 31 with a rectifying bridge 32. The microcircuit 31 changes the loading of the amplifier 28/loop antenna 29 of the RFID reader device 1 via the inductively connected reading signal 10. The change in the loading occurs by controlling the transistor 33. The microcontroller 11 of the RFID reader device 1 detects the change in loading as a change in the signal supplied by the amplifier circuit 28. The microcircuit 31 of the RFID identifier 2 comprises a memory, in which the marking 2' to be read with the RFID reader device 1 is recorded. The microcircuit 31 sends a pulse pattern according to the marking 2' to the RFID reader device 1 by changing the load of the reading signal 10 by controlling a transistor 33.

Figure 3:
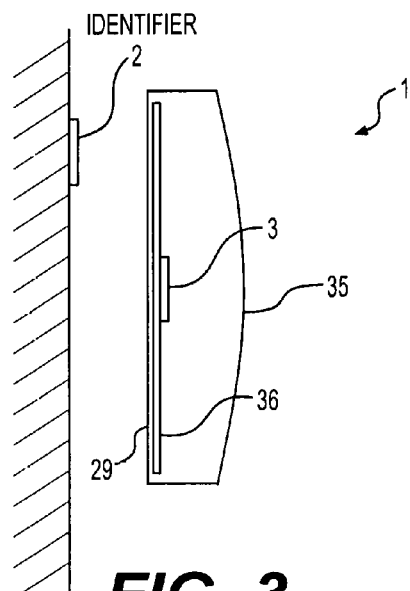
FIG. 3 presents one embodiment of a monitoring arrangement of the operating condition of a reader device.

One problem relating to the embodiments described above is that when the RFID reader device 1 fails, reading of the RFID identifiers 2 disposed in the elevator hoistway 22 no longer succeeds, in which case the elevator car 21 might drive past the RFID identifier of a stopping floor 25 or even past the RFID identifier indicating the extreme limits of permitted movement of the elevator car 21 and onwards to collide with the end buffer of the elevator hoistway 22. For solving this problem, in the elevator system of FIG. 1 a separate RFID identifier, which is used to monitor the operating condition of the RFID reader device 1, is fixed to the RFID reader device 1. RFID (see FIG. 3). The RFID identifier 3 to be used for monitoring the operating condition of the RFID reader device 1 is glued to the surface of the circuit card 36 of the reader device 1. The aforementioned RFID identifier 3 is in this case disposed on a different side of the loop antenna 29 than the RFID identifiers 2 to be read that are situated in the elevator hoistway. The RFID identifier 3 could also be fixed elsewhere to the reader device 1, such as e.g. to the enclosure 35 of the reader device 1.

The RFID identifier 3 to be used for monitoring the operating condition of an RFID reader device 1 is, in terms of its operating principle, of the type presented in FIG. 2. Monitoring of the operating condition of the RFID reader device 1 occurs by reading the marking 3' of the RFID identifier 3 with the reader device 1, and also by comparing the marking 3' read to a reference value recorded in the memory of the microcontroller 11, which reference value indicates the correct value of the marking 3' being read. If the value of the marking 3' read from the RFID identifier 3 in this case deviates from the aforementioned reference value, the microcontroller 11 deduces that the RFID reader device 1 has failed and sends a defect notification 9 to the elevator control unit 27, from where the defect notification 9 is transmitted onwards to the service center.

The marking 3' of the RFID identifier 3 to be read can also be covered and uncovered under the control of the RFID reader device 1, by sending, in connection with the reading signal 10 of the reader device 1, a control signal to the RFID identifier 3. Consequently, the marking 3' is uncovered only during an operating condition monitoring event and is covered after this, in which case the covered marking 3' is not read and consequently the RFID identifier 3 used for monitoring the operating condition does not interfere when reading during normal operation of the elevator the RFID identifiers 2 disposed in the elevator hoistway 22.

Figure 4:
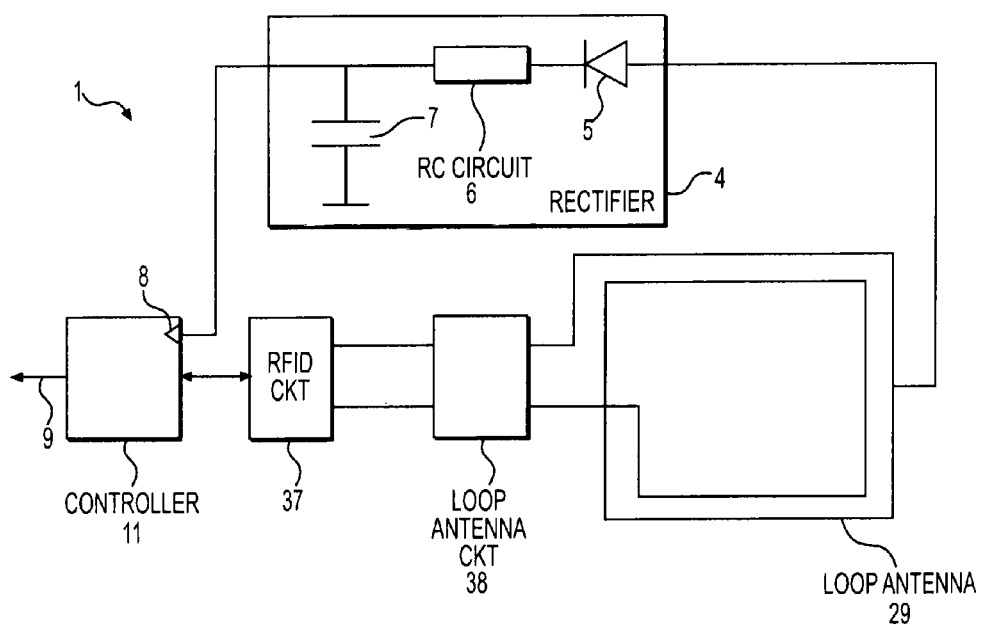
FIG. 4 presents one second embodiment of a monitoring arrangement of the operating condition of a reader device.

FIG. 4 presents an alternative embodiment for monitoring the operating condition of an RFID reader device 1. The embodiment presented in FIG. 4 can be used for monitoring the operating condition of an RFID reader device also in the elevator system of FIG. 1.

In the measuring circuit presented in FIG. 4, the voltage of the loop antenna 29 of the RFID reader device 1 is measured with a rectifying circuit 4. The measuring signal, rectified via the diode 5 and filtered with the RC circuit 6, 7, is taken to the analog-to-digital converter 8 of the microcontroller 11. The microcontroller 8 measures the voltage of the loop antenna 29 when the RFID circuit 37/loop antenna 29 sends a reading signal of the RFID reader device 1. If the measured voltage deviates from the permitted range, i.e. the voltage is to high or too low, the microcontroller 11 deduces that the RFID reader device has failed and sends a defect notification 9. By measuring the voltage of the loop antenna, a possible defect in the RFID circuit 37, the loop antenna 29 or the antenna circuit 38, with which the frequency of the loop antenna 29 is tuned, can be detected.

In the preceding embodiments the invention is described in connection with an elevator system. However, the invention is also suited to e.g. escalator systems and travelator systems.

The invention is described above by the aid of a few examples of its embodiment. It is obvious to the person skilled in the art that the invention is not only limited to the embodiments described above, but that many other applications are possible within the scope of the inventive concept defined by the claims.

The invention claimed is:

1. A method for monitoring a transport system, the method comprising:
measuring a value associated with an operation of a reader device, the reader device configured to perform a transmit operation to transmit a reading signal to read an identifier, if the identifier is situated within range of the reading signal, and a receipt operation to receive a pulse pattern from the identifier in response to the reading signal, the operation including one or more of the transmit operation and the receipt operation; and detecting a presence of a functional nonconformance in the operation of the reader device based on the value associated with operation of the reader device.

2. The method according to claim 1, further comprising:

generating a monitoring signal indicating the functional nonconformance of the reader device, if the detecting detects the presence of the functional nonconformance of the reader device.

3. The method according to claim 2, wherein the measuring includes instructing the reader device to generate the reading signal to read the identifier, and measuring the reading signal; and the detecting the presence of the functional nonconformance of the reader device includes detecting the presence of the functional nonconformance, if a level of the reading signal deviates from an acceptable level.

4. The method according to claim 1, further comprising:

reading, by the reader device, a readable marking of a test identifier.

5. The method according to claim 4, wherein the reading device reads the test identifier after the reading device temporarily uncovers the test identifier.

6. The method according to claim 4, wherein the detecting the presence of the functional nonconformance of the reader device comprises:

reading, from a memory device, an acceptable level of the reading signal associated with the test identifier, and detecting the presence of the functional nonconformance, if a level of the reading signal associated with the readable marking of the test identifier deviates from the acceptable level.

7. A monitoring arrangement for monitoring an operating condition of a reader device, the reader device being configured perform a transmit operation to transmit a reading signal to read an identifier, if the identifier is situated within range of the reading signal associated with the reader device, and to perform a receipt operation to receive a pulse pattern from the identifier in response to the reading signal, wherein the monitoring arrangement comprises:

a measuring device configured to measure a value associated with an operation of the reader device, and to generate measuring data based thereon, the operation including one or more of the transmit operation and the receipt operation; and a monitoring element configured to determine the operating condition of the reader device based on the measuring data.

8. The monitoring arrangement according to claim 7, wherein the monitoring element is configured to generate a monitoring signal indicating a functional nonconformance of the reader device, if the monitoring element detects a presence of the functional nonconformance in the operating condition.

9. The monitoring arrangement according to claim 7, wherein the measuring device is configured to generate the measuring data by measuring a reading signal transmitted by a transmitter associated with the reader device, and the monitoring element is configured to determine the operating condition of the reader device based on the measuring data received from the measuring device.

10. The monitoring arrangement according to claim 7, wherein the monitoring element is configured to determine the operating condition of the reader device based on a result of the reading device reading a readable marking of a test identifier.

11. The monitoring arrangement according to claim 10, wherein the readable marking of the test identifier is configured to be selectively uncovered by the reader device.

12. The monitoring arrangement according to claim 10, wherein the monitoring element is configured to, compare the result of reading the readable marking to one or more monitoring criteria, and generate a monitoring signal indicating a functional nonconformance of the reader device, if the result of reading the readable marking does not fulfill the one or more monitoring criteria.

13. The monitoring arrangement according to claim 10, wherein the one or more monitoring criteria include (i) a failure to read the readable marking of the test identifier, (ii) an absence of data associated reading the readable marking of the test identifier, and (iii) a deviation between a reference value and a reading of the readable marking.

14. A transport system, comprising:

a reader device configured to read an identifier, if the identifier is situated within range of a reading signal of the reader device; and the monitoring arrangement according to claim 7, the monitoring arrangement configured to monitor the operating condition of the reader device.

15. The transport system according to claim 14, wherein the transport system is an elevator system, the elevator system including an elevator car configured to move along guide rails in an elevator hoistway, and the reader device configured to move in the elevator hoistway along with the elevator car.

16. The transport system according to claim 15, wherein the reader device configured to read a readable marking associated with an identifier after the elevator car has arrived at the identifier in an individualized reading point in the elevator hoistway.

17. A Radio-frequency identification (RFID) reader device configured to read RFID identifiers, the RFID identifiers including first RFID identifiers arranged in an elevator hoistway, the RFID reader device comprising:

a board having a second RFID identifier of the RFID identifiers attached thereto;

an antenna configured to transmit a reading signal to active one of the RFID identifiers in proximity thereto, and to receive a pulse pattern from the one of the RFID identifiers in response to the reading signal, the reading signal being a wirelessly-propagating electromagnetic radio-frequency signal, and a processor configured to, measure a value associated with reading the second RFID identifier, and detect a presence of a functional nonconformance in the RFID reader device based on the value associated with reading the second RFID identifier.

18. The RFID reader device of claim 17, wherein the processor is configured to, read, from a memory device, an acceptable value associated with reading the second RFID identifier, and generate a monitoring signal indicating the presence of the functional nonconformance in the RFID reader device, if the value associated with reading the second RFID identifier deviates from the acceptable value.

19. The RFID reader device of claim 17, wherein the value is associated with one of (i) the pulse pattern indicative of a marking associated with the second RFID identifier read by the RFID reader device, and (ii) a voltage of the antenna when transmitting the reading signal.

20. The RFID reader device of claim 17, wherein the processor is configured to transmit the monitoring signal to a service center to request maintenance of the RFID reader device.

* * * * *